United States Patent [19]

Bennett

[11] Patent Number: 4,657,722
[45] Date of Patent: Apr. 14, 1987

[54] ION CLUSTER ACCELERATION

[76] Inventor: Willard H. Bennett, 1609 Glengarry Dr., Cary, N.C. 27511

[21] Appl. No.: 673,765

[22] Filed: Nov. 21, 1984

Related U.S. Application Data

[63] Continuation-in-part of Ser. No. 415,120, Sep. 7, 1982, abandoned, which is a continuation-in-part of Ser. No. 219,619, Dec. 24, 1980, Pat. No. 4,428,901, which is a continuation-in-part of Ser. No. 149,163, May 14, 1980, Pat. No. 4,363,779, which is a continuation-in-part of Ser. No. 871,868, Jan. 24, 1980.

[51] Int. Cl.⁴ .......................... G21B 1/00; G21G 4/02
[52] U.S. Cl. .................................... 376/105; 376/156; 328/228
[58] Field of Search ............... 376/105, 106, 107, 156, 376/170; 328/228; 315/366; 313/359–362

[56] References Cited

U.S. PATENT DOCUMENTS

| | | | |
|---|---|---|---|
| 2,251,190 | 7/1941 | Kullmann et al. | 376/109 |
| 2,795,729 | 6/1957 | Gabor | 315/366 |
| 2,945,982 | 7/1960 | Foster | 315/366 |
| 2,957,097 | 10/1960 | Schagen et al. | 315/366 |
| 2,986,641 | 5/1961 | Michels | 376/109 |
| 3,212,974 | 10/1965 | Le Boutet et al. | 313/361 |
| 3,230,419 | 1/1966 | Bennett | 315/111.01 |
| 3,424,974 | 1/1969 | Tagami | 313/362 |
| 3,526,575 | 9/1970 | Bennett | 376/105 |
| 3,610,989 | 10/1971 | Bennett | 376/105 |
| 3,639,849 | 2/1972 | Bennett | 376/105 |
| 3,665,182 | 5/1972 | Goff et al. | 313/362 |
| 3,760,286 | 9/1973 | Kelley | 376/105 |
| 3,864,640 | 2/1975 | Bennett | 376/105 |
| 3,939,816 | 2/1976 | Espy | 376/105 |
| 3,946,236 | 3/1976 | Roberts et al. | 376/105 |
| 3,968,378 | 7/1976 | Roberts et al. | 376/105 |
| 3,969,628 | 7/1976 | Roberts et al. | 376/105 |
| 3,973,158 | 8/1976 | Otten | 313/362 |
| 4,069,457 | 1/1978 | Martin et al. | 376/120 |
| 4,121,128 | 10/1978 | Roberts | 313/362 |
| 4,128,764 | 12/1978 | Luce | 376/105 |
| 4,363,774 | 12/1982 | Bennett | 376/105 |
| 4,381,280 | 4/1983 | Roberts | 376/105 |
| 4,428,901 | 1/1984 | Bennett | 376/105 |

OTHER PUBLICATIONS

Drummond, James E., "Plasma Physics", pp. 202–223, 1961.
Samuel Glasstone and Ralph H. Lovberg, "Controlled Thermonuclear Reactions", pp. 225–234, 1960.
A. S. Goldhaver and H. H. Heckman, "High Energy Interactions on Nuclei", Annual Review of Nuclear and Particle Science, vol. 28, pp. 161–205, 1978.
J. Chem. Phys., vol. 59, No. 9, Nov. 1974, pp. 4726–4334, Gspann et al.
C. F. Powell, P. H. Fowler and D. H. Perkins, "The Study of Elementary Particles by the Photographic Method", 1959, 669 pp., Pagagomon Press LOC, #59-10527.
Process of 9th Symp. Fusion Technology (1976) pp. 885–890, Hagena et al.
Masche, Relativistic Heavy Ions for Fusion Applications, IEEE Transactions on Nuclear Science, vol. 22, No. 3, Jun. 1975.

*Primary Examiner*—Salvatore Cangialosi
*Attorney, Agent, or Firm*—Hall, Myers & Rose

[57] ABSTRACT

Method and apparatus are disclosed for producing and sustaining a very intense pinch effect in a ralativistic electron beam by applying a continually accelerating strong electric field along the entire length of the beam. A special anode collects electrons that stray from the beam and conducts them along a conducting wall of the anode. The potential drop due to the flow of these electrons in the anode wall produces a strong electric field along the beam. The clusters of heavy ions in the beam impact a target made of lead, for example, and produces various varieties of sub-nuclear products including mesons, neutrons, neutrinos, and hadrons. Electrons liberated from atoms appear adjacent the cathode along with ions also resulting from the liberation. These electrons are accelerated toward the target leaving behind the positive ions which produce a positive potential trough. The positive trough turns electrons in the beam toward the center line of the beam thereby producing an increased electron density and a complementary negative potential trough. The negative potential trough concentrates the positive ions and causes them to accelerate with the beam toward the target.

11 Claims, 7 Drawing Figures

ION CLUSTER ACCELERATION

RELATED APPLICATION

This application is a continuation-in-part of my prior copending application Ser. No. 415,120, filed Sept. 7, 1982 now abandoned, entitled Ion Cluster Acceleration, which is in turn a continuation-in-part of my application Ser. No. 219,619, filed Dec. 24, 1980, now U.S. Pat. No. 4,428,901 granted Jan. 31, 1984, which is in turn a continuation-in-part of my application Ser. No. 149,163, filed May 14, 1980, now U.S. Pat. No. 4,363,779, which in turn is a continuation-in-part of my application Ser. No. 871,868, filed Jan. 24, 1980.

SUMMARY OF THE INVENTION

The ion accelerator of this invention has the usual cathode, and an anode that includes a target. The portion of the anode closest to the cathode has a tubular graphite portion whose entrance end (the end closest to the cathode) flares outwardly. A conducting diaphragm supports the tubular graphite portion. The diaphragm is connected to a grounded ring, located further downstream, by a series of resistive wires that are parallel to the center-line of the beam. A targer is further downstream.

The beam of electrons from the cathode to the target passes along said center-line. As the beam leaves the cathode electrons liberated from atoms enter the beam and the remainder of the atoms form positive ions. As these liberated electrons accelerate toward the target they leave behind said positive ions which produce a positive potential trough. This positive potential trough turns electrons in the beam toward the center-line of the beam thereby increasing the electron density of the beam, and a complementary negative potential trough is formed. The negative potential trough concentrates the positive ions into a cluster and causes them to accelerate with the beam toward the target.

Each ion of this cluster of positive ions has such a large velocity and kinetic energy that when it strikes the target, which is made of lead or other material having a mass number greater than 70, the impact produces subnuclear products such as mesons, neutrons, neutrinos, and hadrons.

DETAILED DESCRIPTION OF THE INVENTION

Figure 1:
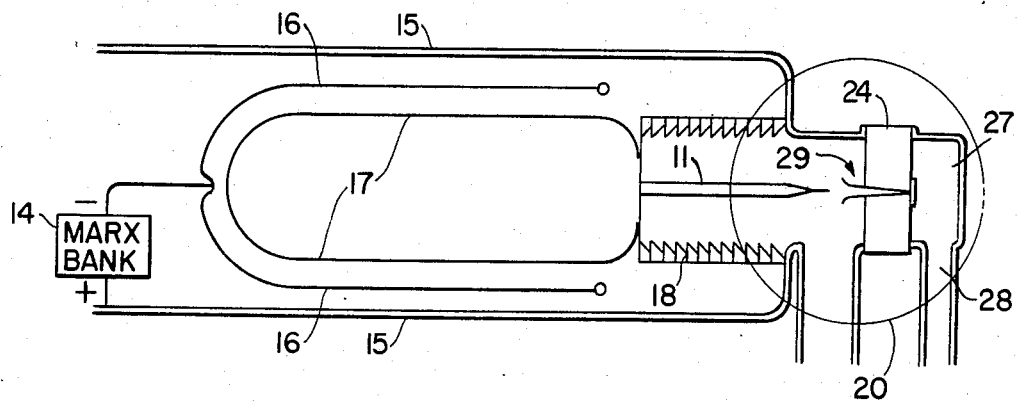
FIG. 1 is a schematic side view of one form of the invention.

In FIG. 1, a conventional Marx Bank 14 applies a potential difference between grounded shell 15 and suspended electrode 16. The inner electrode 17 is attached to and supported by discharge tube 18 which comprises a series of washer-like rings. The cathode 11 discharges electrons to the anode 29 which comprises a bulkhead 24 that has a tapered channel 22 leading the electron beam to the target comprising, for example, a lead mass 26. The channel 22 is of dielectric material but has a conductive liner 23 and a flared entrance 21 graphite or other partially conductive material.

Figure 2:
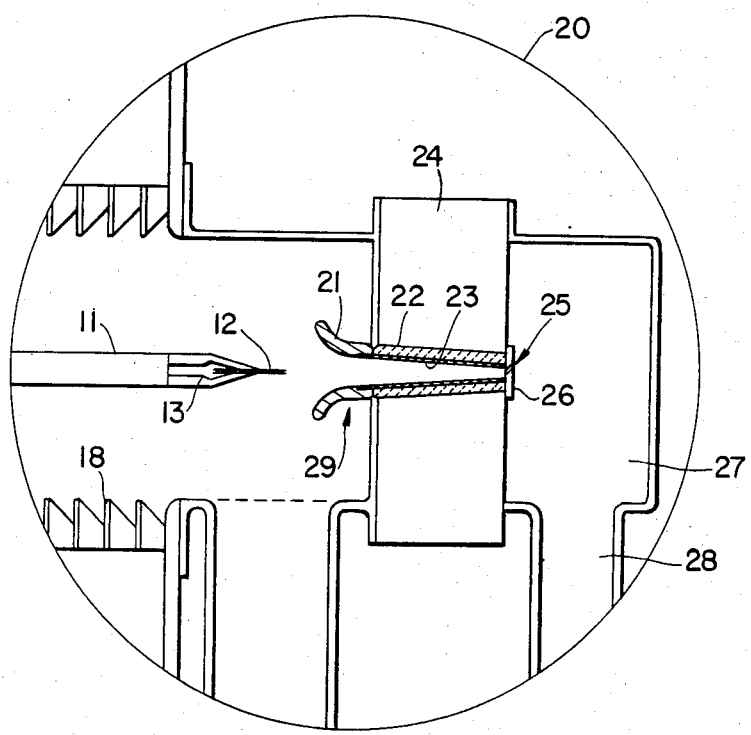
FIG. 2 is a detailed view of that portion of FIG. 1 enclosed in circle 20.

In FIG. 2, the portion of the tubular anode 21 which is nearest to the cathode tip may be made of graphite or it can be an extension of the thin metal liner 23 which should preferably be made of a resistive alloy such as Inconel, or any one of many other resistive alloys, and should have such a thickness as to produce a potential drop along the length of the liner approaching a tenth the voltage of the cathode when the discharge current from the cathode has risen to more than half its maximum value. The liner 23 is supported by a dielectric sleeve 22 which in turn is supported by the bulkhead 24. The liner 23 is electrically grounded to the bulkhead at or near the target 26 which is also grounded to the bulkhead. If it is desired to accelerate clusters of mercury ions, the cathode 12 can be a hollow dielectric tube. A pool of mercury 13 provides the vapor which flows out of the cathode to be ionized, collected and accelerated by the electron beam. The collection chamber 27 is pumped by a mercury diffusion pump through pipe 28 and a mercury vapor trap can be used with this pump whose temperature is held at a suitable value to provide the desired flow of mercury vapor through the small aperture 25. This aperture is at an angle from the center line and is located near the side and away from the center line to avoid interfering with the beam and cluster impacting the target.

Figure 3:
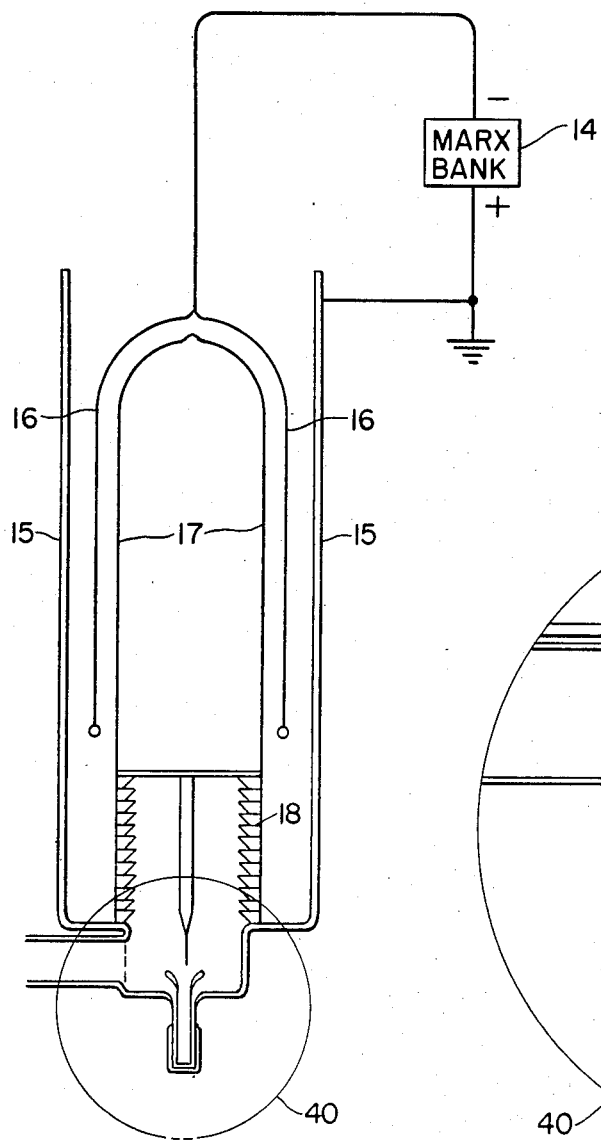
FIG. 3 is a schematic side view of a second form of the invention.

The arrangement in FIG. 3 shows the apparatus rotated into a vertical position. An advantage of this arrangement is that liquid nitrogen or other coolent can easily be used for cooling the tubular anode 43 and its surrounding containing wall 51 for any applications where that is needed. Another difference is that the tubular anode 43 is self-supporting.

Figure 4:
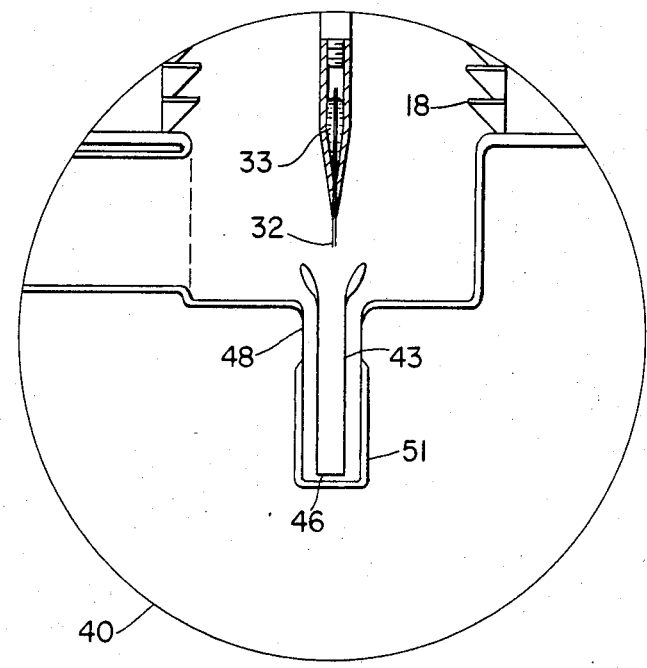
FIG. 4 is a detailed view of that portion of FIG. 3 enclosed in circle 40.

In FIG. 4, a mercury pool is shown at 33 and the cathode at 32. A graphite section 41 of the tubular anode is mechanically and electrically connected to the resistive tubular section 43 which in turn is electrically connected to and supported at its lower end by the container 51. In order to be able to submerge the reduced diameter portion 51 of the container in a coolant, such as liquid nitrogen, it is convenient to connect this portion 51 to the main upper larger portion of the container by a thin metal wall section 48.

Figure 5:
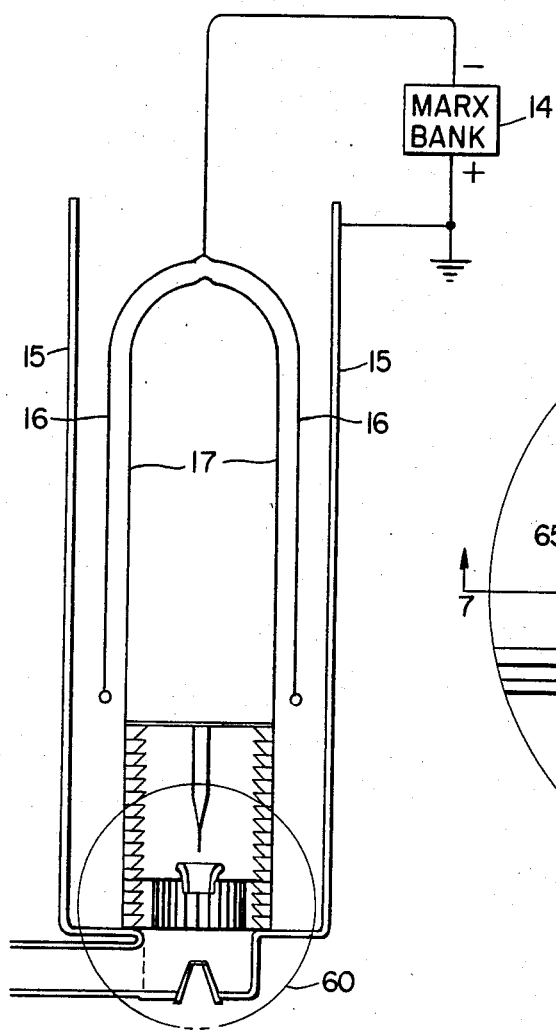
FIG. 5 is a schematic side view of a third form of the invention.
Figure 6:
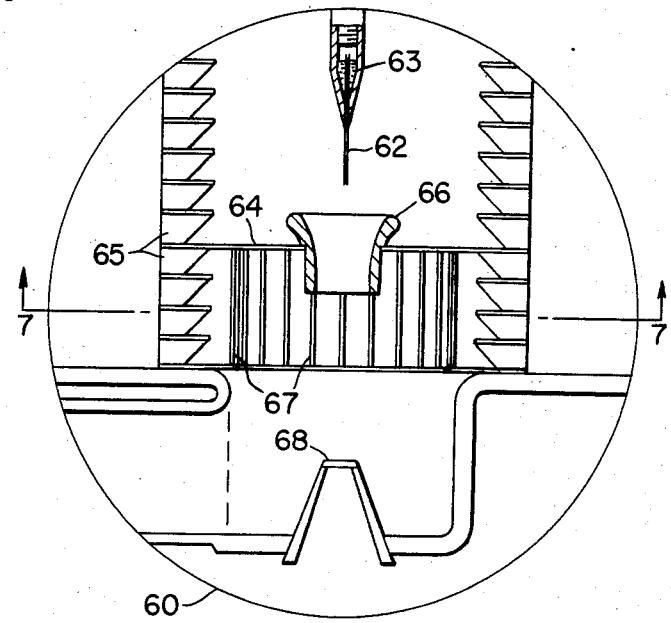
FIG. 6 is a detailed view of that portion of FIG. 5 enclosed in circle 60.
Figure 7:
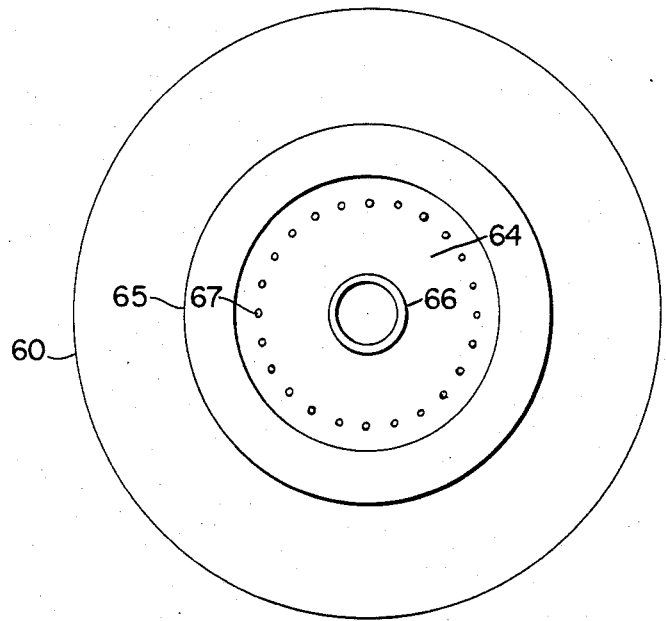
FIG. 7 is a sectional view taken along line 7—7 of FIG. 6.

In FIGS. 5 and 6, there is a Marx Bank similar to that in FIG. 1 which applies a potential difference across grounded shell 15 and suspended electrode 16. The inner electrode 17 is attached to and supported by discharge tube 18. The discharge tube 18 comprises a stack of washer-like rings, two of which 65 and 65 are of special construction since they carry the diaphragm 64 which in turn carries tubular graphite piece 66 which flares outwardly at its upper end. The tubular cathode 52 narrows as it approaches its discharge end, and has a mercury pool 63 which discharges mercury through the hole running downstreamwardly through the tubular cathode 52.

The target 68 is positioned across the end of the anode which is farthest from the target. There is a return path for the electrons that reach the target 68; this return path comprising the grounded shell 15. The anode (which comprises parts 66, 67 and 68) comprises means for forming a potential trough that collects and accelerates ions toward the target.

Sub-nuclear products, such as mesons, neutrons, neutrinos, and hadrons, are produced by the collision of ions with the target 68. To achieve this result two things are involved, first, the target 68 is composed of material whose mass number is at least 70; suitable materials such as, lead, bismuth, tin, tungsten, and alloys of one or more of the foregoing elements. Secondly, the potential applied between the cathode and the anode should preferably be so high as to give each ion of the cluster a kinetic energy sufficient to produce one or more of mesons, neutrons, neutrinos, hadrons, etc. Under these circumstances, the collision of the ions with the target will produce said sub-nuclear products.

In FIGS. 5 and 6, for example, the distance from the free end of cathode 62 to the upper end of the tubular metal or graphite piece 66 would be about 5 to 20 centimeters. As the electrons and ions enter the tubular piece 66, pinching of the beam begins and during the next 20 or more centimeters of travel the electrons, that were separated from atoms during the producing of ions, are accelerated rapidly towards the target and that leaves behind a positive potential trough. However, in providing this positive potential trough, the magnetic field that accompanies the pinch deflects beam electrons towards the center-line of the beam and thereby locally produces a negative potential trough which collects and concentrates positive ions into a cluster of ions in the beam. These positive ions are accelerated from the point where the cluster is formed, toward the target (a distance that is preferably at least 8 centimeters) since they are in a negative potential trough that is accelerated toward the target.

Assuming the distances, referred to in the immediately preceding paragraph, the required potential difference between the anode and the cathode would normally be at least five million volts.

The impact of the cluster upon the target 68 can be looked upon in the following way. The impact of each such heavy ion in the cluster upon a target nucleus, after the ion has been accelerated to the same velocity as the electrons in the electron beam, produces collision processes in two parts, one of which includes the sub-nuclear products in a forward narrow cone, and the other which includes a collection of the fragments of both the projectile and target nuclei dispersing randomly about the moving center of mass of the two impacting particles. By virtue of the very high momentum of the projectile ion, the center of mass is moving at a velocity at nearly that of the velocity of light, and consequently, all of the products of the disintegration of the two impacting particles will also be moving (in the laboratory frame of reference) in a narrow forward cone. The products of the earlier collisions of the clusters upon the target, moving in narrow forward cones, immerse the target nuclei downstream so that the projectile nuclei which are also moving at approximately the velocity of light collide with target nuclei which are also immersed in said showers of sub-nuclear particles so that the particles in the collisions progressively lose their identity and in effect fuse in those collisions which occur deeper and deeper into the target.

In order to achieve the beam, and the impact, as described above the apparatus shown in FIGS. 1 to 6 inclusive should be adjusted and operated as follows. First, the diameter of the cathode should be selected to avoid streamers in the discharge along the cathode and off of the end of the cathode. In order to accomplish this, a diameter for portion 12, 32 or 62 of the cathode should be selected at an approximate diameter of about 1 mm. for the last centimeter of the length of the cathode, namely, that particular 1 centimeter portion of the cathode which is closest to the anode. The preferred exact diameter is determined by substituting cathodes having various diameters for tube 12, etc. respectively, until the diameter is found which best avoids streamers.

It is also desirable to adjust the rate of flow of the mercury from the pool 13 out the free end of the dielectric cathode portion 12. Here again, the adjustment of the flow rate of the mercury vapor out the end of tube 12 is accomplished by substituting different cathodes into the apparatus until the correct mercury flow rate is achieved. The correct rate will result in a density of mercury ions in the beam which will attract the electrons in the beam toward the center line of the beam with a force which is in excess of the force exerted on the ions toward the axis by virtue of the pinch effect. The rate of flow of the mercury vapor may be increased or decreased by either varying the internal diameter of, or the length of the dielectric tube 12 which projects into the vicinity of the mercury pool 13 and is also located inside the metal cathode holder 11.

As stated above, the mercury ions will cause a force toward the center line to be exerted on the electrons toward the axis of the beam. The excess force, which results from the ions attracting the electrons in the beam, results from a higher density of positive ions than is required for the pinch effect. This is obtained by introducing an increased positive ion production (by means of mercury gas) in the vicinity of the beam. The extra force is produced by the positive mercury ions introduced in the vicinity of the beam. This causes an increase in the density of beam electrons near the center line and produces the local potential trough which is attractive to the cluster of mercury ions which overlie this potential trough and are moving forward and backward in the potential trough. The mercury ions that are not as highly ionized or as well located as to be held firmly in the cluster in the potential trough will drift rearwardly from the potential trough, toward the cathode, and be lost. This purging of the cluster of the less firmly held ions is essential to the formation of a cluster of ions which will follow the potential trough and be accelerated progressively towards the anode by increasing in velocity. The potential trough cannot run away from the cluster of ions because the potential trough is produced mainly by the cluster.

In order to collect, concentrate and accelerate heavy ion clusters as accomplished in this invention, it is necessary to produce and sustain a very intense pinch effect in the relativistic electron beam particularly in the portion of the electron beam nearer to the target and within the tubular anode whose diameter is much reduced below the diameter of the tube around the cathode. In order to produce the pinch effect along the entire length of the beam, it is necessary to apply a continually accelerating applied electric field along the entire beam. This has been accomplished in the various designs and methods disclosed in my previous application Ser. No. 149,163 by virtue of the penetration of the applied electric field into the hollow tubular anodes of the various designs.

The basic improvement in the design of the tubular anode as described above makes this invention fully effective in a much broader range of kinds of applications.

One mercury ion moving at the same velocity as the electrons in a 10,000,000 volt beam has an energy of over $4.10^{12}$ eV (4000 GeV) which is greater than the highest energy ever given an ion of any element by a man-made machine. The effects of the impact of the nucleus of such a high energy mercury ion on a nucleus in a solid state heavy element like lead should include the production of many more varieties of nuclear fragments and mesons including neutrons, neutrinos and hadrons, and also including those of much greater energy than are seen in the figures shown in "Annual Review of Nuclear and Particle Science", Vol., 28, pages 164 and 166, 1978. (Annual Reviews, Inc., 4139 El Camino Way, Palo Alto, Calif. 94306, in an article by Goldhaber and Heckman). FIG. 1 shown on page 164 shows products from a 72 GeV argon nucleus colliding with a silver nucleus in the emulsion. The argon projectile is shattered into 5 helium nuclei in the forward narrow cone with about the same velocity as the argon nucleus had. There is also a negative pion particle in the same forward cone which comes to rest and forms a three-pronged star. The target silver nucleus is shattered into comparatively low velocity fragments in random directions about the moving center of mass of the argon and silver combination. FIG. 2 shown on page 166 of the reference shows the interaction of 72 GeV argon projectile nucleus striking a lead target nucleus. There are at least 63 product particles including protrons, neutrons, light fragments and pions including at least one negative pion. There is also a forward cone of high energy products as in FIG. 1.

These figures show a much lower projectile energy (72 GeV instead of 4000 GeV) and a much smaller nuclear mass (40 instead of about 200) than in the example mentioned above of the mercury ion at the velocity of the electrons in a 10,000,000 volt beam. A far greater difference is that there is only one projectile nucleus in the above examples instead of the order of $10^8$ heavy nuclei in a compact cluster as is inherent in this method and process. Although there are many more nuclear and sub-nuclear fragments in the forward cone, there is a much more important difference when a compact cluster is the projectile, instead to single ions well separated from any other ions. The jets in narrow cones of very high energy sub-nuclear and nucleonic products from those collisions of ions occurring earlier upon entry of the cluster into the target will envelop and immerse the colliding nuclei farther into the target so that those later colliding have begun to lose their identity and to fuse by the time each later arriving projectile has fully engaged the strongly activated target nucleus.

Throughout the history of the developing physics of heavy ion collisions, each increase by several times of the energy of the projectile ion, or the mass of either or both of the projectile ion or target ion, has resulted in the production of new kinds of particles as for example the recent recognition of what are called "anomolons" which have collision cross-sections an order of magnitude greater than any of the high energy secondary products of lower energy collisions of such ions. (See *Physics Today*, pages 17–19, April 1982). It should be apparent from the above description that this new method for accelerating clusters of heavy nuclei provides for the first time the capability of producing the following new nuclear processes:

(1) the production of strong concentrated directed beam yields of neutrons and neutrinos from heavy nuclei;

(2) the production of shock waves and Mach cones in nucleus-nucleus collisions with the attendant production of compressed nuclear matter with consequences of kinds suggested by recent astrophysical discoveries;

(3) during this transition fusion of the composite nucleus of atomic mass of the order of 400, by virtue of the coherent induced radiation of neutrinos and electrons, analogous to the coherent induced optical radiation in lasers, the production of stable and quasi-stable elements at the so-called stable islands of atomic number much above any presently known element;

(4) the containment and utilization of the highly energetic and actinic yields from heavy ion fusion in the production of nuclear power as is done deep inside the sun and which can never be accomplished with the current attempts here on earth to produce fusion power using ionizesd low atomic number gases or multiple laser beams.

The description contained in the next three paragraphs is applicable to each of FIGS. 1 to 7.

The electron beam from the cathode 12, 32 or 62 to the anode 29, 43 or 66 collects ions from the vicinity of the cathode tip 12, 32 or 62 and begins to concentrate them in a cluser en route to the tapared metal or graphite piece 21, 41 or 66. This further concentrates the cluster en route towards the target, 26, 46 or 68 while accelerating the cluster of accelerated ions up to the velocity of the electrons in the beam and impelling that cluster into the target at that velocity.

Near the cathode 12, 32 or 62, gas atoms are ionized and the electrons are accelerated away from the cathode 12, 32 or 62 while the ions are initially accelerated towards the cathode 12, 32 or 62 at a much slower rate, thus allowing an excess of positive ions to accumulate, thus producing locally a positive potential trough. This trough in combination with the pinch effect, deflects the on-coming electrons towards the center line of the beam until the above positioned positive potential trough is reversed to a negative potential trough which collects positive ions and accelerates them away from the cathode. This occurs only in a small section of the beam near the center line and does not reverse the electric field over most of the space in front of the cathode.

The collection of the cluster of ions occurs in the negative potential trough just before the electrons in the beam are deflected towards the center line of the beam. The cluster of ions collects adjacent to, and slightly overlapping, the moving negative potential trough. The interaction of the positive and negative potential troughs continues to intensify and accelerate during their movement toward the target while approaching the velocity of the beam electrons.

The formation of the positive and negative troughs, and the function of the negative trough in accelerating ions toward the target, has been explained above. However, in at least some cases it is desirable to have an electric field to sustain the beam with said troughs therein. The electric field may also increase the acceleration of the ions toward the target. The means and method of providing this electric field will now be explained.

In FIG. 2, electrons from cathode 12 strike graphite piece 21 and these electrons will flow along that piece and then through the partially conductive tubular member 23 to the target 26. This current flow creates a potential difference between (1) the end of graphite piece 21 that is closest to the target, and (2) the target. This potential difference creates the electric field referred to above.

Similarly, in FIG. 4, electrons from cathode 32 strike graphite piece 41 and then flow along the partially conductive wall of tube 43 to the target 46, thereby creating a potential difference along parts 41 and 43, in turn creating the desired electric field.

FIG. 6 works in the same overall manner as FIGS. 2 and 4, except that there is a departure so far as generating the potential difference is concerned. In this figure, electrons from the cathode 62 are intercepted by graphite piece 66 and fed to diaphragm 64 and then flow along paralled wires 67 to grounded ring 70. The potential difference between graphite piece 66 and grounded ring 70 creates the desired electric field.

In FIG. 2, chamber 27 is an optional addition to the system. It is a partially evacuated ionization chamber, partially exhausted through outlet 28. Chamber 27 contains a low pressure gas containing mercury ions and some of this gas leaks through hole 25 in target 26 to provide ionized gas in the vicinity of the point where the beam strikes the target. This enhances the pinch of the beam.

All three forms of the invention may work in the following modified manner if a number of ions exist, or are formed, directly in front of the cathode. The application of a high voltage negative pulse to the cathode in the presence of a low density gas such as mercury vapor projects electrons from the cathode tip into the gas. The electrons ionize the gas with an efficiency which rises next to the cathode tip to a maximum at a distance where the potential difference from the cathode tip is about 50 to 100 volts, and then decreases from there on as the potential difference increases. Thus, there is a thin region surrounding the cathode tip where there is an increased density of ionizing collisions. The electrons separated from the ions in these ionizations are swept downstream away from the cathode leaving behind the ions so produced which are swept upstream much more slowly due to the greater mass of the ions. The ions contribute a positive charge to the beam which acts as a weak positive potential trough. This potential trough extends along the beam and attracts the beam electrons towards the centerline of the beam. Some of the beam electrons that are deflected toward, and pass the centerline of the beam, are deflected so much that they go past the centerline and keep going thus leaving the beam. Where the density of those beam electrons which are deflected toward the centerline build up to a maximum there is a negative potential trough which builds up. As soon as this negative potential trough has built up enough, it is capable of entrapping some of the more slowly moving ions which move forward and drop into the negative potential trough. As the electrons responsible for the negative potential trough increase in density, the trough increases in speed and the entrapped positive ions pick up speed to the same degree. The pinch effect in the beam over the length of the potential trough increases in strength and pinches down the diameter of the trough and the cluster of ions that have been entrapped increases in speed. Thus, the diameter of the cluster decreases or in other words is pinched. In this way the progress of the negative potential trough and its entrapped cluster of positive ions speed up with the result that ions have increased energy, the cluster is increasingly concentrated and the rate of increase of the kinetic energy of the ions also increases.

I claim to have invented:

1. An ion accelerating device comprising:
   a cathode,
   an anode,
   said anode comprising tubular conducting means having its centerline along the centerline of the beam,
   a target,
   means for accelerating a beam of electrons from the cathode through the anode to the target, including means for placing a potential difference between the cathode and the anode,
   means for supplying ions to the beam so that the ions are accelerated toward the target,
   the improvement wherein:
   the target being positioned across the end of the tubular anode that is farthest from the cathode,
   a return path for the electrons reaching the target for conducting the electrons that reach the target,
   said anode comprising means for forming a potential trough that collects and accelerates ions toward the target.

2. An ion accelerating device as defined in claim 1 in which the tubular conducting means is made of material resistive to flow of electrons and the cross-section of the tubular conducting means being sufficiently small so that the tubular conductive means will intercept some electrons that have strayed from the beam and so that the flow of such electrons along the tubular conductive means will sustain an electrical field.

3. An ion accelerating device as defined in claim 2 in which:
   said tubular conducting means has a diameter that increases along at least a limited portion thereof adjacent the end thereof closest to the cathode.

4. An ion accelerating device as defined in claim 2 in which said limited portion flares outwardly as it approaches said end thereof closest to the cathode, said tubular conductive means being composed of material resistive to the electrical current so that there will be a potential drop across it and so that an electric field will be created that accelerates the beam.

5. An ion accelerating device as defined in claim 4 in which:
   said tubular conducting means includes a dielectric sleeve surrounding said tubular conducting means, and a bulkhead around said sleeve,
   said sleeve preventing said bulkhead from shorting said tubular conducting means.

6. An ion accelerating device as defined in claim 2 comprising:
   a limited portion adjacent that end of said tubular conductive means that is closest to the cathode being composed of graphite, so that a spark-over to the anode will not be a sustained one.

7. The method of accelerating ions through a tubular anode to a target comprising:
   providing a cathode spaced from said anode,
   establishing a beam of electrons that leaves said cathode and enters said tubular anode and then passes through said tubular anode to the target,
   positioning the target adjacent the end of the anode that is farthest from the cathode,
   providing a return path for the electrons reaching the target,
   adding ions to the beam, forming a potential trough in said beam to move ions toward the target, and intensifying said potential trough while the beam is traveling in said anode and toward the target, whereby to collect and move at least some of said ions towards the target.

8. The method of claim 7 in which said anode has an electric field which intensifies said potential trough and collects and moves at least some of said ions towards the target.

9. The method of claim 8 in which said anode has high resistivity and has a current flowing along the same whereby said anode has said electric field.

10. The method of claim 7 comprising providing substantial electrical resistivity for the anode, and conducting an electric current along said anode whereby said anode has an electric field that intensifies said potential trough.

11. The method of claim 10 in which said electric field is maintained in intensity along the path starting at the end of the anode farthest from the target and extending to the end of the anode closest to the target.

* * * * *